(12) United States Patent
Roy-Faderman

(10) Patent No.: US 10,146,510 B2
(45) Date of Patent: Dec. 4, 2018

(54) CUSTOM METAMETADATA WITH PACKAGABLE RECORDS

(71) Applicant: salesforce.com, inc., San Francisco, CA (US)

(72) Inventor: Avrom Roy-Faderman, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 480 days.

(21) Appl. No.: 13/933,776

(22) Filed: Jul. 2, 2013

(65) Prior Publication Data

US 2014/0157225 A1 Jun. 5, 2014

Related U.S. Application Data

(60) Provisional application No. 61/667,345, filed on Jul. 2, 2012, provisional application No. 61/667,808, filed on Jul. 3, 2012.

(51) Int. Cl.
*G06F 9/44* (2018.01)
*G06F 8/00* (2018.01)
*G06F 9/54* (2006.01)

(52) U.S. Cl.
CPC ............... *G06F 8/00* (2013.01); *G06F 9/542* (2013.01)

(58) Field of Classification Search
CPC .......................................................... G06F 9/44
USPC ..................... 717/100, 101, 102, 106, 107
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Final Office Action for U.S. Appl. No. 13/934,550 dated Nov. 20, 2015, 12 pages.

(Continued)

*Primary Examiner* — Jae Jeon
(74) *Attorney, Agent, or Firm* — Jaffery, Watson, Mendonsa & Hamilton, LLC

(57) ABSTRACT

Techniques for providing custom metadata in a multi-tenant database environment in which hardware and software of the multi-tenant database system is shared by one or more organizations, each having one or more corresponding users. Each of the organizations has associated organization data and organization metadata. Activating procedural code is triggered in response to a trigger event determined by a platform interface. The procedural code is to query the organization metadata provided by the associated organization through a metadata interface provided by a platform developer. The platform interface is provided by the platform developer and the procedural code utilizes compile time dependencies to generate custom metametadata to be maintained by the platform developer and to be provided to the organizational metadata, which is to be maintained by the corresponding organization. The organization data owned by the organization is written to with the procedural code in response to results of the query.

21 Claims, 4 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,151,584 A * | 11/2000 | Papierniak | G06Q 30/02 705/7.32 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,464,366 B2 * | 12/2008 | Shukla et al. | 717/100 |
| 7,519,976 B2 * | 4/2009 | Blevins | 719/328 |
| 7,620,655 B2 | 11/2009 | Larsson et al. | |
| 7,640,533 B1 * | 12/2009 | Lottero | G06F 8/71 717/108 |
| 7,802,230 B1 * | 9/2010 | Mendicino | G06F 9/541 717/105 |
| 7,926,030 B1 | 4/2011 | Harmon | |
| 8,069,437 B2 * | 11/2011 | Aigner et al. | 717/109 |
| 8,769,704 B2 * | 7/2014 | Peddada et al. | 726/28 |
| 8,799,233 B2 * | 8/2014 | Brooks | G06F 8/68 707/687 |
| 9,269,060 B2 * | 2/2016 | Maes | G06Q 10/06 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260595 A1 * | 12/2004 | Chessell | G06F 11/0748 714/47.2 |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0187930 A1 * | 8/2005 | Subramanian | G06F 11/3668 |
| 2005/0223022 A1 | 10/2005 | Weissman et al. | |
| 2006/0074736 A1 * | 4/2006 | Shukla et al. | 705/8 |
| 2007/0168935 A1 * | 7/2007 | Ogami | G06F 8/30 717/106 |
| 2007/0168962 A1 | 7/2007 | Heinke et al. | |
| 2007/0201654 A1 * | 8/2007 | Shenfield | G06F 9/44521 379/201.01 |
| 2008/0086495 A1 * | 4/2008 | Kiziltunc | G06Q 10/10 |
| 2008/0195936 A1 * | 8/2008 | White | G06F 9/451 715/246 |
| 2009/0119255 A1 | 5/2009 | Frank et al. | |
| 2009/0205013 A1 * | 8/2009 | Lowes | G06F 21/10 726/1 |
| 2010/0161682 A1 | 6/2010 | Pfeifer et al. | |
| 2011/0107243 A1 | 5/2011 | Jain et al. | |
| 2011/0265020 A1 | 10/2011 | Fields et al. | |
| 2011/0282899 A1 | 11/2011 | Mathew et al. | 707/769 |
| 2012/0066755 A1 | 3/2012 | Peddada et al. | 726/8 |
| 2012/0096521 A1 * | 4/2012 | Peddada | G06F 21/629 726/4 |
| 2012/0110020 A1 | 5/2012 | Weissman et al. | 707/783 |
| 2012/0110566 A1 * | 5/2012 | Park | 717/174 |
| 2012/0166976 A1 | 6/2012 | Rauh et al. | |
| 2012/0174013 A1 | 7/2012 | Kraus et al. | |
| 2012/0223951 A1 * | 9/2012 | Dunn et al. | 345/467 |
| 2012/0233186 A1 * | 9/2012 | Hammer | G06Q 10/06 707/755 |

(56) References Cited

U.S. PATENT DOCUMENTS

| | | | |
|---|---|---|---|
| 2012/0239629 A1* | 9/2012 | Brooks et al. | 707/687 |
| 2012/0246120 A1* | 9/2012 | Brooks et al. | 707/687 |
| 2012/0304307 A1* | 11/2012 | Ramesh et al. | 726/28 |
| 2012/0323860 A1 | 12/2012 | Yasa et al. | |
| 2013/0055118 A1* | 2/2013 | Donovan et al. | 715/763 |
| 2013/0055201 A1* | 2/2013 | No et al. | 717/113 |
| 2013/0117291 A1 | 5/2013 | Roy-Faderman | |
| 2013/0218911 A1* | 8/2013 | Li | G06F 17/30289 707/754 |
| 2013/0304713 A1* | 11/2013 | Roy-Faderman | G06F 17/30371 707/702 |

OTHER PUBLICATIONS

Final Office Action for U.S. Appl. No. 13/934,550 dated Nov. 3, 2016, 12 pages.

Non-Final Office Action for U.S. Appl. No. 13/934,550 dated Jan. 3, 2018, 15 pages.

Non-Final Office Action for U.S. Appl. No. 13/934,550 dated Jun. 22, 2015, 15 pages.

Non-Final Office Action for U.S. Appl. No. 13/934,550 dated May 6, 2016, 12 pages.

Final Office Action for U.S. Appl. No. 13/934,550 dated Jul. 27, 2018, 13 pages.

\* cited by examiner

CUSTOM METAMETADATA WITH PACKAGABLE RECORDS

PRIORITY AND RELATED APPLICATION DATA

This application claims priority to Provisional U.S. Patent App. No. 61/667,808, filed on Jul. 3, 2012, entitled "System and Methods for an Extensible Framework to Expose Metametadata for Dynamically Generated UIs," by Avrom Roy Faderman as well as Provisional U.S. Patent App. No. 61/667,345, filed on Jul. 2, 2012, entitled "Custom Metametadata with Packagable Records," by Avrom Roy-Faderman, which are incorporated herein by reference in their entirety and for all purposes.

TECHNICAL FIELD

The present disclosure relates generally to use or metametadata in multitenant environments. More particularly, the present disclosure relates to custom object records in a multitenant environment through a standard interface.

BACKGROUND

On demand platforms, together with open mechanisms for exchanging applications, provide the ability to third parties to develop and exchange applications supporting cloud ecosystems. Not only do cloud providers deliver application functionality, an entire ecosystem of independent software vendors (ISVs) is vying with one another to extend application offerings. These efforts make online applications better without additional input, guidance nor funding from the cloud service providing the platform. The platform is a successful mechanism for extending cloud applications, but platforms are limited in terms of extending their own functionality.

BRIEF DESCRIPTION OF THE DRAWINGS

The included drawings are for illustrative purposes and serve only to provide examples of possible structures and process steps for the disclosed techniques for integrating on-demand applications and remote jobs. These drawings in no way limit any changes in form and detail that may be made to implementations by one skilled in the art without departing from the spirit and scope of the disclosure.

DETAILED DESCRIPTION

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

Described herein are systems, methods and computing code to achieve extending platform functionality by enabling ISVs (or, for example, high-level enterprise developers) to create new platform features that their customers (or organizations) can use. In one embodiment, an entire ecosystem of platform features can be provided.

In some embodiments, the platform may enable a special type of collaboration, both within organizations and via ISV/subscriber relationships. In one embodiment, the platform may allow sophisticated, programmatic developers to give declarative developers and administrators the ability to enjoy expanded functionality. For example, in one embodiment, a programmatic developer can create a new declarative platform feature, and others can build applications with it by pointing and clicking. As a result, developer productivity can increase if complex code only has to be written once, by one person, in one organization's application, and could be seamlessly integrated into other organizations' applications in a declarative way.

Figure 1:
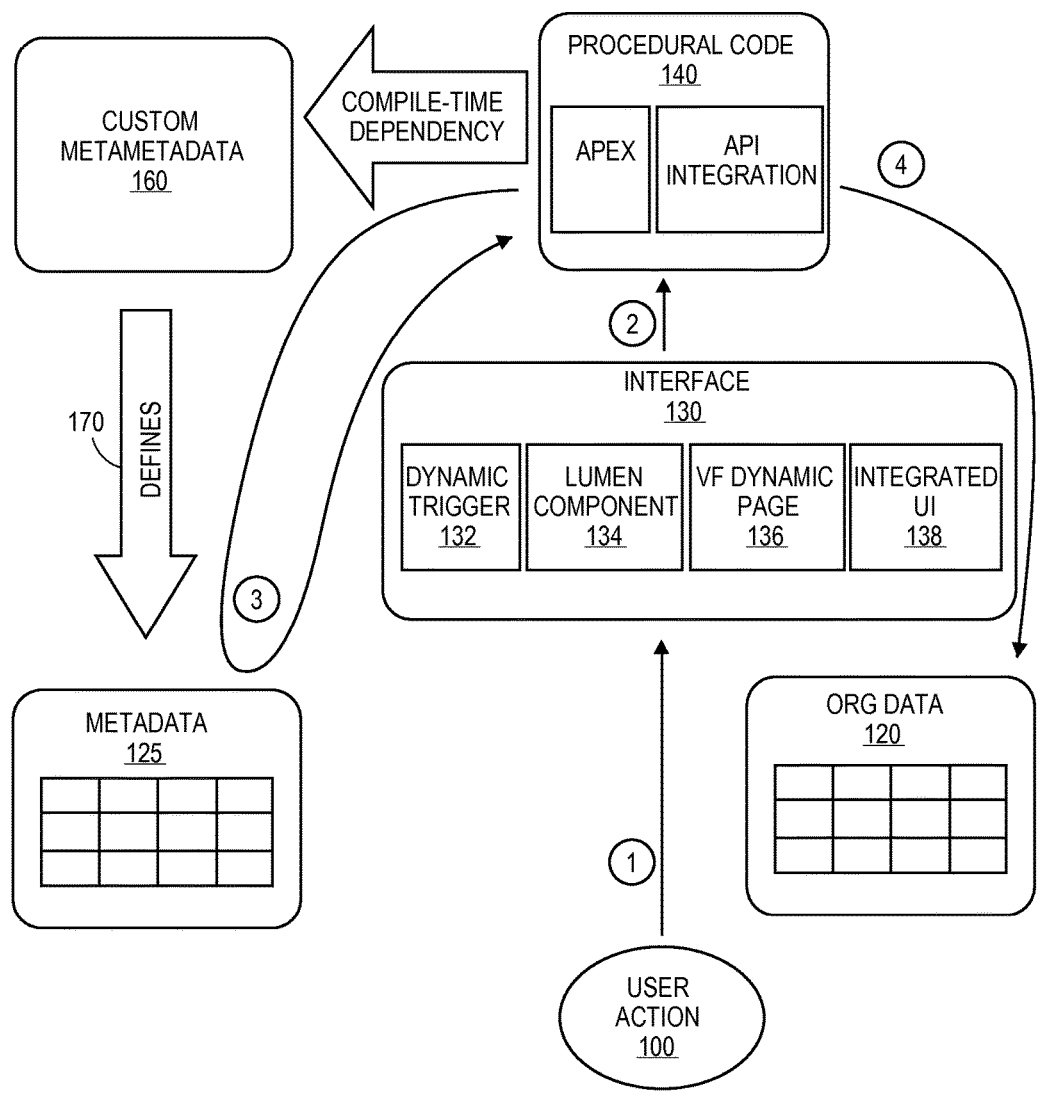
FIG. 1 is a conceptual diagram of one embodiment of an interrelation of declarative platform features that can provide custom metadata functionality.

In one embodiment, a metadata mechanism can be provided that facilitates tooling; ISVs can develop integrations that write multitenant database environment level metadata into individual organizations. For example, an ISV, can provide a trigger that does not specify an entity at compile time. Instead, a customer or organization can couple the trigger to their own entities using metadata. In effect, this lets partners extend a save process, and their customers can enable the new save process for any triggerable entities without writing code. Alternatively, instead of writing a single trigger that can be coupled to many entities, a partner could write a code generator that, when given an entity, uses the metadata mechanism to add a trigger with the right body to that entity. As used herein, the term "metametadata" refers to custom metadata about metadata, which is a new/different type of metadata. In one embodiment, a declarative (i.e., metadata-driven) feature provides a mechanism for the form the metametadata takes. FIG. 1, below, provides a runtime flow example.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. Embodiments of multi-tenant databases are described in greater detail below.

FIG. 1 is a conceptual diagram of one embodiment of an interrelation of declarative platform features that can provide custom metadata functionality. In one embodiment, the diagram of FIG. 1 illustrates what platform-on-the-platform (PotP) providers provide to deliver a declarative platform features to support custom metadata functionality as described herein.

In one embodiment, in response to user action 100, the custom metadata functionality is provided. User action 100, can be, for example, a user action through a graphical user interface (GUI), or a user may provide/insert data in another manner. Alternatively, the custom metadata functionality can be activated through, for example, a time-based workflow, an inbound web service call, or other non-user initiated action.

In the example of FIG. 1, organization data 120 and metadata 125 are provided by an organization or application within the multi-tenant database environment. That is organization data 120 and metadata 125 belong to the organization to which the user belongs. Also, in the example of FIG. 1, interface 130, procedural code 140 and custom metametadata 160 are provided by a platform developer and/or the multi-tenant database environment.

In one embodiment, interface 130 includes a hook of some type that is enabled by standard multi-tenant database functionality. In one embodiment, this hook activates flexible procedural code 140. In one embodiment, the platform provider can provide both the hook and the code. In one embodiment, interface 130 includes dynamic trigger 132, which can operate as the hook described above to activate some or all of procedural code 140.

In some embodiments, user interface components may be provided using technologies and formats that are widely used for the organization and display of information, such as HTML, Java®, JavaScript®, Cascading Style Sheets (CSS), Adobe® PDF, or DOC format. Alternately, or additionally, user interface components may be provided using proprietary technologies and formats that are made available by the provider of an on-demand service environment, such as the Lumen™, Apex™, and VisualForce™ (VF) technologies available from Salesforce.com® of San Francisco, Calif. These technologies can be used to provide, for example, Lumen component 134 and/or VF dynamic page 136.

In one embodiment, procedural code 140 operates to query metadata 125 provided by the consuming organization/application to determine the appropriate behavior for the corresponding trigger. In response to the metadata retrieved from the query, procedural code 140 operates to write results to organization data 120. Procedural code 140 may also provide UI displays, trigger an event (e.g., email notification, SMS message), etc.

In one embodiment, procedural code 140 utilizes compile time dependencies 150 to generate custom metametadata 160, which is maintained by the platform developer. Custom metametadata 160 can be provided, via defines 170, to metadata 125, which is maintained by the consuming organization/application.

These new types of metadata can be referred to as custom setup objects. Records for the custom setup objects are metadata. Custom metametadata may be useful for platform-on-the-platform development. In one embodiment, custom setup object records can be editable through procedural code 140 and readable through external data interfaces. Using an example from the Salesforce.com® multi-tenant database environment the custom setup object records are editable through the Metadata interface and are read-only through the External data interface. In other multi-tenant environments, different interfaces can be utilized.

Continuing the salesforce.com example, allowing custom platform object record accesses through the Metadata interface is more complex than allowing standard Setup record accesses. Because customers/partners can create custom setup objects, each individual custom setup object cannot be included in the Metadata Web Service Definition Language (WSDL) code. In one embodiment, an NVP model for a custom setup object can be used:

```
<CustomSetupObjectRecord
    type="platVendorNs.PlatVendorsCustomSetupObject__c"
    developerName="appVendorNs.AppVendorsCustomSetupObjectRecord">
  <FieldValue
      field="platVendorNs.PlatVendorsCustomSetupObject__c.PlatVendorsField1__c"
      value="OurValue" />
  <FieldValue
      field="platVendorNs.PlatVendorsCustomSetupObject__c.PlatVendorsField2__c"
      value="5" />
</CustomSetupObjectRecord>
```

In this embodiment, a single WSDL example, is sufficient for the record (a record has a type and a name and in contains FieldValue elements with a field name and a value).

In one embodiment, continuing with the salesforce.com environment example, if custom setup object records are metadata, then they can be accessible (in one embodiment, both readable and writable) through the Metadata interface. This is useful for developer tools and is an effective packaging capability. By enabling platform-on-the-platform development, a new form of collaboration between independent platform vendors and independent application vendors can be supported.

In one embodiment, independent platform vendors can provide the custom setup objects that their procedural code consumes, but independent application vendors, in order to use the platform's features, create records for the custom setup objects. In one embodiment, in order to package the application, these records are packages and are accessible through the Metadata interface.

In one embodiment, custom setup object records are readable through external data interfaces. In one embodiment, during runtime (as illustrated in FIG. 1, for example), custom setup object behavior is implemented through data interfaces. In the salesforce.com example, this can be done directly or through Apex™, rather than the Metadata interface, so to use custom setup object records the data interfaces must be able to access the custom setup object records.

In one embodiment, in order to keep a clear metadata/data split, which can be important for things like editability for managed statistics, customers and/or partners are not allowed to use the standard data interface to insert, update or delete these records because the records are not data; they are metadata. In one embodiment, custom setup object records are editable through internal versions of the data interface.

The examples below are a few examples of situations in which custom metametadata can be utilized. The examples herein are not intended to be exhaustive because the metametadata mechanisms described herein are powerful and flexible and have wide application.

An ISV (or other entity) can provide a custom setup object to implement a universal picklist and a junction object linking the picklist to particular fields, which can be, for example, text fields, number fields, etc. The ISV could, for example, provide a Lumen component that, rather than displaying these fields as text fields in the UI, would create a dropdown list with appropriate options.

An ISV (or other entity) can provide a custom setup object to implement a page layout with child custom setup object to represent each layout item (and its attendant rules) and use a Lumen application or dynamic VF page (which consults the setup object records) to display the page at runtime. A similar custom setup object-based layout could include fields from related objects.

Intelligent related lists can be provided as custom setup objects that refer to particular foreign key fields on the child object to distinguish between different relationships. These lists can be rendered using a VF or Lumen component. The previous examples are just a few of the possibilities that custom metametadata can be utilized to provide.

Figure 2:
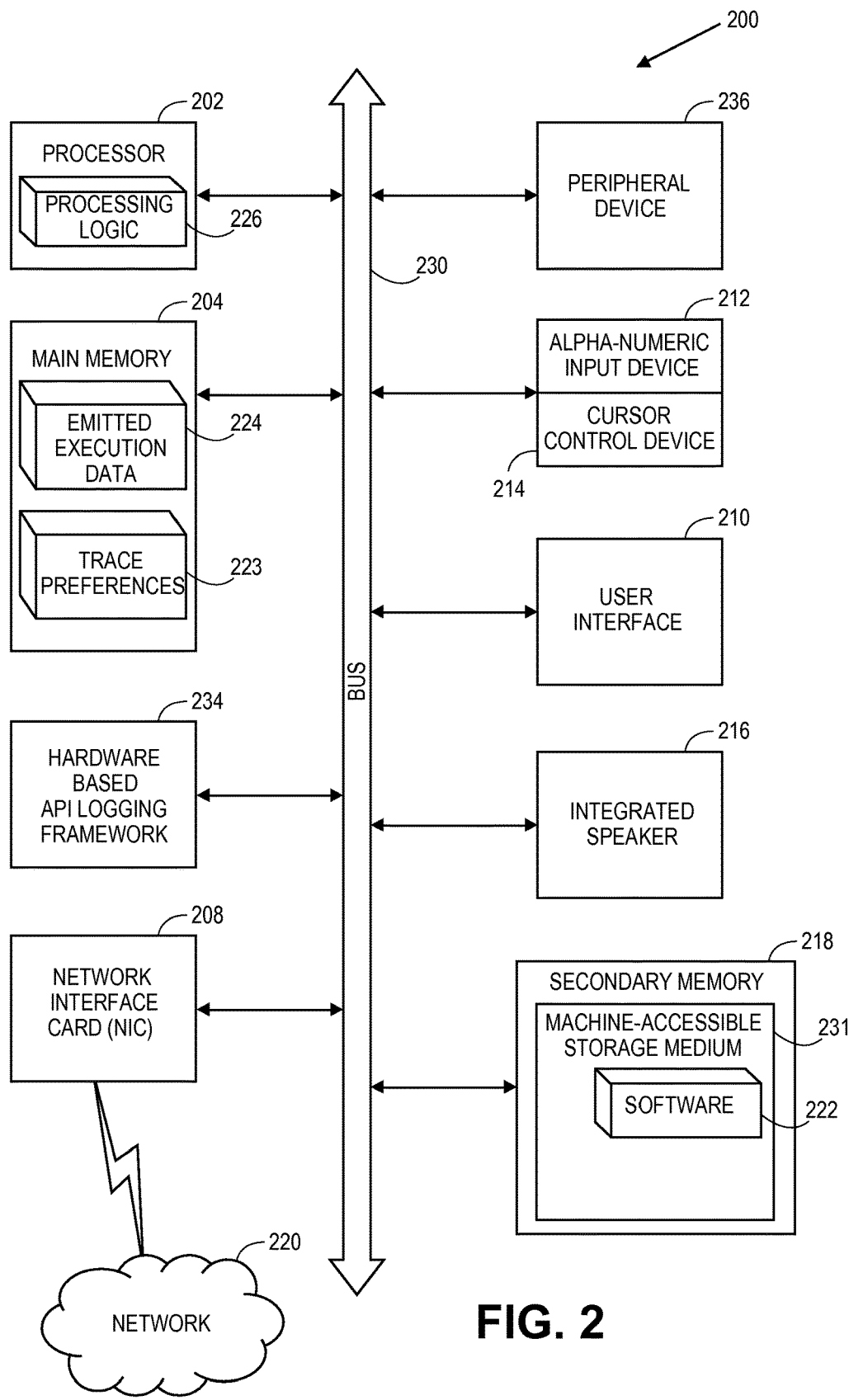
FIG. 2 is a block diagram of one embodiment of a computer system.

FIG. 2 illustrates a diagrammatic representation of a machine 200 in the exemplary form of a computer system, in accordance with one embodiment, within which a set of instructions, for causing the machine 200 to perform any one or more of the methodologies discussed herein, may be executed. In alternative embodiments, the machine may be connected (e.g., networked) to other machines in a Local Area Network (LAN), an intranet, an extranet, or the Internet.

The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 200 includes a processor 202, a main memory 204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 218 (e.g., a persistent storage device including hard disk drives and persistent multi-tenant data base implementations), which communicate with each other via a bus 230. Main memory 204 includes emitted execution data 224 (e.g., data emitted by a logging framework) and one or more trace preferences 223 which operate in conjunction with processing logic 226 and processor 202 to perform the methodologies discussed herein.

Processor 202 represents one or more general-purpose processing devices such as a microprocessor, central processing unit, or the like. More particularly, the processor 202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), network processor, or the like.

The computer system 200 may further include a network interface card 208. The computer system 200 also may include a user interface 210 (such as a video display unit, a liquid crystal display (LCD), or a cathode ray tube (CRT)), an alphanumeric input device 212 (e.g., a keyboard), a cursor control device 214 (e.g., a mouse), and a signal generation device 216 (e.g., an integrated speaker). The computer system 200 may further include peripheral device 236 (e.g., wireless or wired communication devices, memory devices, storage devices, audio processing devices, video processing devices, etc. The computer system 200 may further include a Hardware based API logging framework 234 capable of executing incoming requests for services and emitting execution data responsive to the fulfillment of such incoming requests.

The secondary memory 218 may include a machine-readable storage medium (or more specifically a machine-accessible storage medium) 231 on which is stored one or more sets of instructions (e.g., software 222) embodying any one or more of the methodologies or functions of dynamic adaptive configuration management database systems described herein. The software 222 may also reside, completely or at least partially, within the main memory 204 and/or within the processor 202 during execution thereof by the computer system 200, the main memory 204 and the processor 202 also constituting machine-readable storage media. The software 222 may further be transmitted or received over a network 220 via the network interface card 208. The machine-readable storage medium 231 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 3:
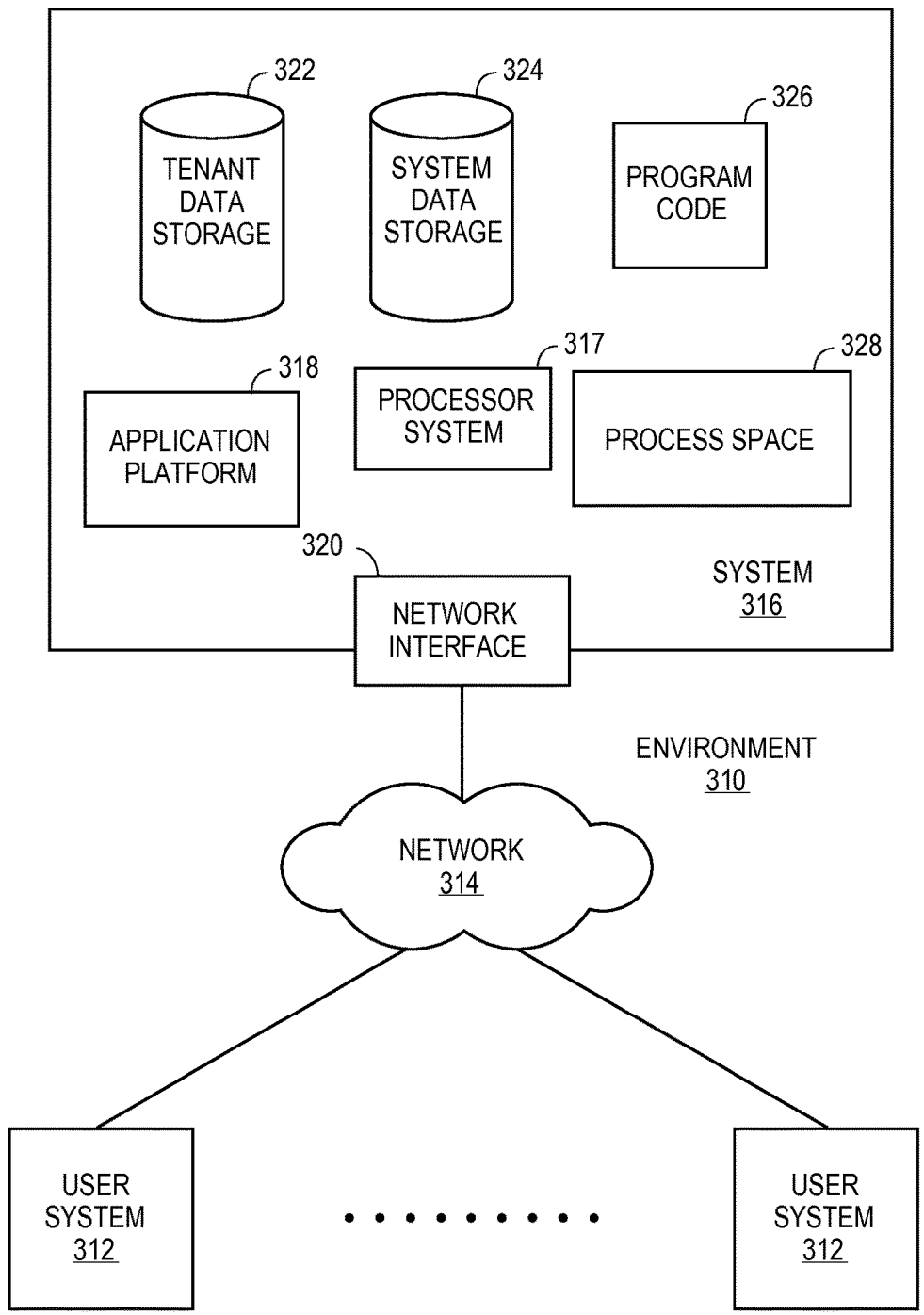
FIG. 3 is a block diagram of one environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
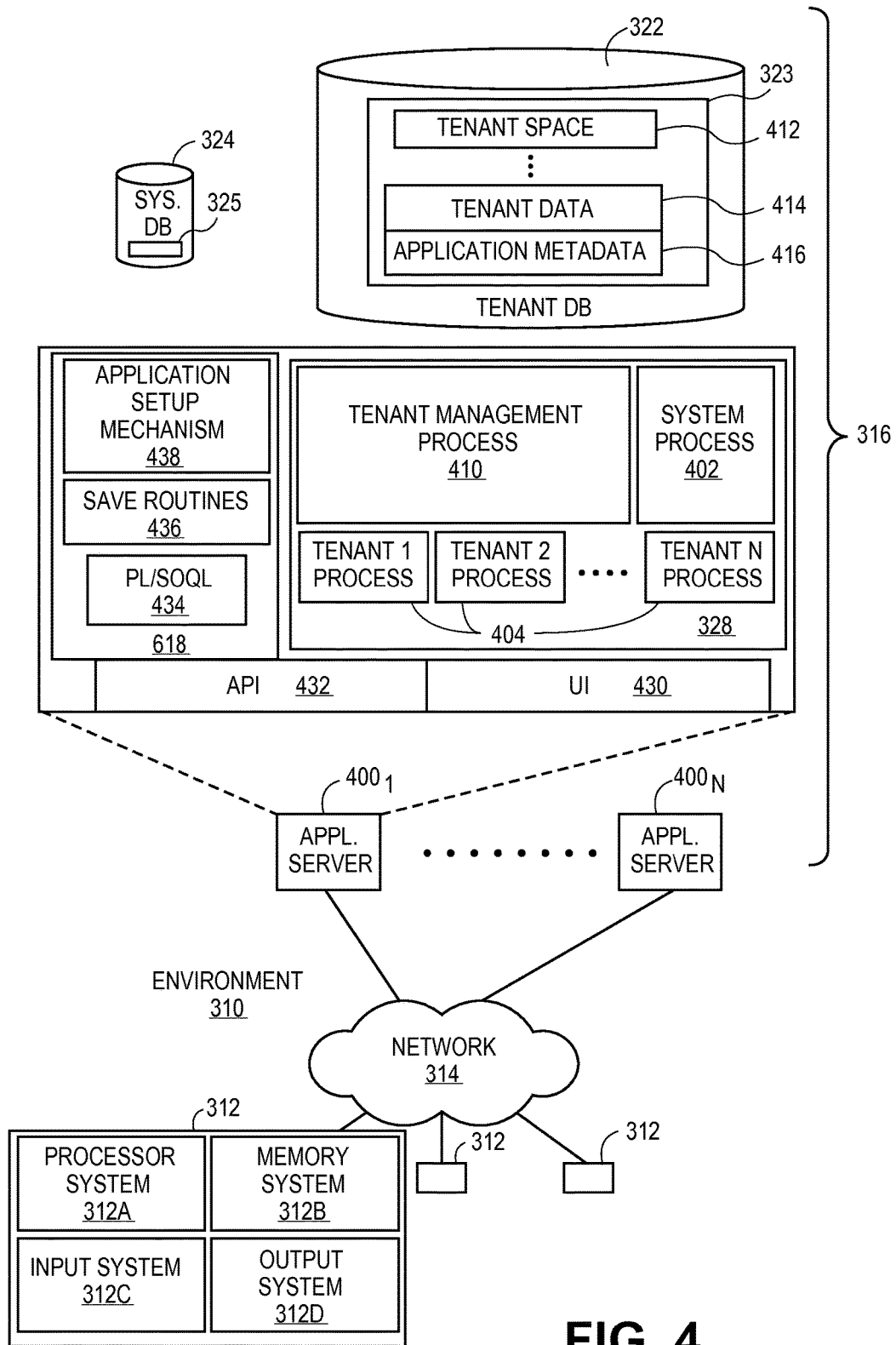
FIG. 4 is a block diagram of one embodiment of elements of environment of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 400$_1$-400$_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method for utilizing metametadata, the metametadata comprising custom metadata about metadata in a multitenant database environment provided via a platform in which hardware and software of the multi-tenant database system is shared by two or more organizations, each having one or more corresponding users, wherein each of the two or more organizations has associated organization data and organization metadata and organization metametadata, the method comprising:
coupling a trigger to procedural code using the metadata, wherein the trigger does not specify an entity at compile time;
triggering, in response to a trigger event determined by a standard platform interface, the procedural code to query the organization metadata provided by the associated organization through a metadata interface provided by a platform developer, wherein the standard platform interface is provided by the platform developer and the procedural code utilizes one or more compile time dependencies to generate custom metametadata, which is to be maintained by the platform developer;
generating the metametadata utilizing a declarative feature to determine the form the metametadata takes for a corresponding tenant within the multi-tenant database, wherein one or more tenants in the multitenant environment generate custom records of an object provided by the platform developer and the metametadata is utilized to provide functionality to the tenant; and
writing to the organization data owned by the organization using the custom records with the procedural code.

2. The method of claim 1, wherein the procedural code is provided by a platform developer.

3. The method of claim 1, wherein the trigger event comprises receiving user input.

4. The method of claim 1, wherein the trigger event comprises insertion of data.

5. The method of claim 1, wherein the procedural code comprises a portion of a time-based workflow.

6. The method of claim 1, wherein the procedural code comprises an inbound service call.

7. The method of claim 1, wherein writing the data comprises one or more of a user interface (UI) modification, a message trigger, and a message integration.

8. An article of manufacture comprising a non-transitory computer-readable medium having instructions to cause one or more processors to provide metametadata, the metametadata comprising custom metadata about metadata in a multi-tenant database environment in which hardware and software of the multi-tenant database system is shared by two or more organizations, each having one or more corresponding users, wherein the custom metadata comprises data about metadata and each of the two or more organizations has associated organization data and organization metadata and organization metametadata, the instructions to:
couple a trigger to procedural code using the metadata, wherein the trigger does not specify an entity at compile time;
trigger, in response to a trigger event determined by a standard platform interface, procedural code to query the organization metadata provided by the associated organization through a metadata interface provided by a platform developer, wherein the standard platform interface is provided by the platform developer and the procedural code utilizes one or more compile time dependencies to generate custom metametadata, which is to be maintained by the platform developer;
generate the metametadata utilizing a declarative feature to determine the form the metametadata takes for a corresponding tenant within the multi-tenant database, wherein one or more tenants in the multitenant environment generate custom records of an object provided by the platform developer and the metametadata is utilized to provide functionality to the tenant; and write to the organization data owned by the organization using the custom records with the procedural code.

9. The article of manufacture of claim 8 wherein the procedural code is provided by a platform developer.

10. The article of manufacture of claim 8, wherein the trigger event comprises receiving user input.

11. The article of manufacture of claim 8, wherein the trigger event comprises insertion of data.

12. The article of manufacture of claim 8, wherein the procedural code comprises a portion of a time-based workflow.

13. The article of manufacture of claim 8, wherein the procedural code comprises an inbound service call.

14. The article of manufacture of claim 8, wherein writing the data comprises one or more of a user interface (UI) modification, a message trigger, and a message integration.

15. A system comprising one or more computing devices to provide a multi-tenant database environment in which hardware and software of the multi-tenant database system is shared by two or more organizations, each having one or more corresponding users, wherein the functions to utilize metametadata, the metametadata comprising custom metadata comprises data about metadata and each of the two or more organizations has associated organization data and organization metadata and organization metametadata, and the hardware components of the system couple a trigger to procedural code using the metadata, wherein the trigger does not specify an entity at compile time;

trigger, in response to a trigger event determined by a standard platform interface, procedural code to query the organization metadata provided by the associated organization through a metadata interface provided by a platform developer, wherein the standard platform interface is provided by the platform developer and the procedural code utilizes one or more compile time dependencies to generate custom metametadata, which is to be maintained by the platform developer;

generate the metametadata utilizing a declarative feature to determine the form the metametadata takes for a corresponding tenant within the multi-tenant database, wherein one or more tenants in the multitenant environment generate custom records of an object provided by the platform developer and the metametadata is utilized to provide functionality to the tenant; and write to the organization data owned by the organization using the custom records with the procedural code.

16. The system of claim 15, wherein the procedural code is provided by a platform developer.

17. The system of claim 15, wherein the trigger event comprises receiving user input.

18. The system of claim 15, wherein the trigger event comprises insertion of data.

19. The system of claim 15, wherein the procedural code comprises a portion of a time-based workflow.

20. The system of claim 15, wherein the procedural code comprises an inbound service call.

21. The system of claim 15, wherein writing the data comprises one or more of a user interface (UI) modification, a message trigger, and a message integration.

* * * * *